(12) United States Patent
Hung

(10) Patent No.: US 11,548,616 B1
(45) Date of Patent: Jan. 10, 2023

(54) SPLIT-FLAP WING ASSEMBLY FOR A HIGH ENDURANCE AIRCRAFT

(71) Applicant: Lucas Kai-Luen Hung, Miamisburg, OH (US)

(72) Inventor: Lucas Kai-Luen Hung, Miamisburg, OH (US)

( * ) Notice: Subject to any disclaimer, the term of this patent is extended or adjusted under 35 U.S.C. 154(b) by 1 day.

(21) Appl. No.: 17/188,400

(22) Filed: Mar. 1, 2021

Related U.S. Application Data

(60) Provisional application No. 62/983,958, filed on Mar. 2, 2020.

(51) Int. Cl.
*B64C 9/20* (2006.01)
*B64C 9/02* (2006.01)
*B64C 3/58* (2006.01)

(52) U.S. Cl.
CPC .................. *B64C 9/20* (2013.01); *B64C 3/58* (2013.01); *B64C 9/02* (2013.01)

(58) Field of Classification Search
CPC ............... B64C 9/20; B64C 3/58; B64C 9/02
See application file for complete search history.

(56) References Cited

U.S. PATENT DOCUMENTS

| 2,112,154 | A | * | 3/1938 | Hall | B64C 9/16 244/123.1 |
|---|---|---|---|---|---|
| 2,152,974 | A | * | 4/1939 | Riviere | B64C 9/20 244/216 |
| 2,173,538 | A | | 9/1939 | McKellar | |
| 2,279,615 | A | | 4/1942 | Bugatti | |
| 2,387,492 | A | | 10/1945 | Blaylock et al. | |
| 2,404,956 | A | | 7/1946 | Gouge | |
| 2,612,329 | A | | 9/1952 | Crandall et al. | |
| 2,643,833 | A | | 6/1953 | Ambrose | |
| 2,661,166 | A | * | 12/1953 | Gordon | B64C 9/20 244/216 |
| 2,791,385 | A | | 5/1957 | Johnson | |

(Continued)

FOREIGN PATENT DOCUMENTS

| CN | 109334950 A | 2/2019 |
|---|---|---|
| JP | 2013-23217 | 2/2013 |

OTHER PUBLICATIONS

Non-final Office Action dated Aug. 31, 2021 in related U.S. Appl. No. 16/452,787, filed Jun. 26, 2019 (8 pages).

(Continued)

*Primary Examiner* — Brian M O'Hara
(74) *Attorney, Agent, or Firm* — Daniel F. Nesbitt; Nesbitt IP LLC

(57) ABSTRACT

A split-flap wing assembly having a wing with a flap frame, a flap having a lateral pivot axis, and one, two or more flap sweep members having a forward end attached at a hinge in a forward end of the flap frame of the wing, and a rearward end attached pivotally to a flap hinge of the flap along the lateral pivot axis. The flap sweep members are pivotable at the forward end from a neutral sweep position within the flap frame, to a deployment angle at which the rearward end of the flap sweep members are farther away from the wing's camber line, to form a slot between the flap frame and a forward edge of the flap that allows airflow from along the lower surface of the wing to flow through the slot and to the interior surface of the flap.

20 Claims, 9 Drawing Sheets

(56) References Cited

U.S. PATENT DOCUMENTS

| | | | | |
|---|---|---|---|---|
| 3,776,491 | A | * | 12/1973 | Oulton ..................... B64C 9/14 244/218 |
| 3,884,433 | A | * | 5/1975 | Alexander ............. B64D 33/04 244/110 B |
| 4,120,470 | A | * | 10/1978 | Whitener ................ B64C 9/323 244/215 |
| 4,498,646 | A | | 2/1985 | Proksch et al. |
| 4,717,097 | A | | 1/1988 | Sepstrup |
| 5,071,088 | A | | 12/1991 | Betts |
| 5,170,963 | A | | 12/1992 | Beck, Jr. |
| 5,551,651 | A | | 9/1996 | Hendrickson |
| 5,735,485 | A | | 4/1998 | Ciprian et al. |
| 6,079,672 | A | | 6/2000 | Lam et al. |
| 6,276,641 | B1 | | 8/2001 | Gruenewald et al. |
| 6,554,229 | B1 | | 4/2003 | Lam et al. |
| 7,510,151 | B2 | | 3/2009 | Perez-Sanchez |
| 7,520,471 | B2 | | 4/2009 | Reckzeh et al. |
| 7,740,205 | B1 | | 6/2010 | Nahas |
| 8,302,913 | B2 | | 11/2012 | Schlipf |
| 8,418,954 | B2 | | 4/2013 | Allen |
| 8,418,968 | B2 | | 4/2013 | Grip |
| 8,567,727 | B2 | | 10/2013 | Morris |
| 8,651,430 | B2 | | 2/2014 | Voss et al. |
| 8,991,768 | B1 | | 3/2015 | Chase et al. |
| 9,016,638 | B2 | | 4/2015 | Dahl et al. |
| 9,284,034 | B2 | | 3/2016 | Otto |
| 9,359,065 | B2 | | 6/2016 | Moser et al. |
| 9,403,564 | B1 | | 8/2016 | Al-Huwaider |
| 9,555,875 | B2 | | 1/2017 | Burchard |
| 9,815,547 | B2 | | 11/2017 | Saliveros et al. |
| 9,846,432 | B2 | | 12/2017 | Lam et al. |
| 9,873,502 | B2 | | 1/2018 | Good et al. |
| 10,005,544 | B2 | | 6/2018 | Shmilovich et al. |
| 11,046,421 | B2 | * | 6/2021 | Decker ..................... B64C 7/00 |
| 11,046,425 | B2 | * | 6/2021 | Wagner .................. F16H 25/20 |
| 2005/0017126 | A1 | | 1/2005 | McLean et al. |
| 2011/0031347 | A1 | | 2/2011 | Allen |
| 2011/0135472 | A1 | | 6/2011 | Cazals et al. |
| 2012/0056038 | A1 | | 3/2012 | Grip |
| 2012/0280089 | A1 | | 11/2012 | Keller |
| 2016/0031546 | A1 | | 2/2016 | Rolston |
| 2019/0002076 | A1 | | 1/2019 | Markley et al. |
| 2019/0322358 | A1 | | 10/2019 | Kato et al. |
| 2020/0055585 | A1 | | 2/2020 | Hung |

OTHER PUBLICATIONS

Hung, Lucas, "EXtended Flaps and Airbrakes (EXFA) Technology", Montgomery County Science Day (Dayton, OH), Mar. 3, 2018, Abstract, 1 page.

Hung, Lucas, "EXtended Flaps and Airbrakes (EXFA) Technology", Montgomery County Science Day (Dayton, OH), Mar. 3, 2018, Presentation Paper, 21 pages.

Hung, Lucas, "EXtended Flaps and Airbrakes (EXFA) Technology", Montgomery County Science Day (Dayton, OH), Mar. 3, 2018, Presentation Poster, 22 pages.

Hung, Lucas, "EXFA on the Fly: Testing the In-Air Performance of the EXtended Flaps and Airbrakes (EXFA) System", Intel International Science and Engineering Fair (ISEF) (Phoenix, AZ), Abstract, May 12-17, 2019, 1 page.

Hung, Lucas., "EXFA on the Fly: Testing the In-Air Performance of the EXtended Flaps and Airbrakes (EXFA) System", Intel International Science and Engineering Fair (ISEF), Ohio State Science Day (Columbus, OH), Presentation Poster, May 11, 2019, 1 page.

Hung, Lucas., "EXFA on the Fly: Testing the In-Air Performance of the EXtended Flaps and Airbrakes (EXFA) System", Montgomery County Science Day (Dayton, OH), Abstract, Mar. 2, 2019, 1 page.

Hung, Lucas., "EXFA on the Fly: Testing the In-Air Performance of the EXtended Flaps and Airbrakes (EXFA) System", Ohio State Science Day (Columbus, OH), Abstract, Mar. 11, 2019, 1 page.

Hung, Lucas., "EXFA on the Fly: Testing the In-Air Performance of the EXtended Flaps and Airbrakes (EXFA) System", Intel International Science and Engineering Fair (ISEF), Ohio State Science Day (Columbus, OH), Presentation Paper, Mar. 11, 2019, 35 pages.

Hung, Lucas., "EXFA on the Fly: Testing the In-Air Performance of the EXtended Flaps and Airbrakes (EXFA) System", Montgomery County Science Day (Dayton, OH), Presentation Paper, Mar. 2, 2019, 33 pages.

Hung, Lucas., "EXFA on the Fly: Testing the In-Air Performance of the EXtended Flaps and Airbrakes (EXFA) System", Montgomery County Science Day (Dayton, OH), Presentation Poster, Mar. 2, 2019, 28 pages.

Hung, Lucas., "EXFA on the Fly: Testing the In-Air Performance of the EXtended Flaps and Airbrakes (EXFA) System", West District Science Day (Wilberforce, OH), Abstract, Mar. 23, 2019, 1 page.

Hung, L. et al., "Development of a Multi-Purpose Flap and Spoiler Mechanism for High Endurance Unmanned Aerial Vehicles", Dayton-Cincinnati Aerospace Sciences Symposium (DCASS) (Dayton, OH), Mar. 3, 2020, 1 page.

Hung, L. et al., "Development of a Multi-Purpose Flap and Spoiler Mechanism for High Endurance Unmanned Aerial Vehicles", Dayton-Cincinnati Aerospace Sciences Symposium (DCASS) (Dayton, OH), Presentation Slides, Mar. 3, 2020, 31 pages.

Anderson, et al., "Understanding Flight", The McGraw-Hill Companies, Inc., (2001), 249 pages.

Anderson, Jr., John D., "Introduction to Flight—Chapter 5—Airfoils, Wings, and Other Aerodynamic Shapes", Third Edition (1989), McGraw-Hill Book Company, p. 178-258 (90 pages).

Wikipedia, "Airbrake Air brake (aeronautics)" (available at https://web.archive.org/web/20170331124904/https://en.wikipedia.org/wiki/Air_brake_(aeronautics) ), 2 pages, Mar. 17, 2017.

"F4E Slat Operation", Youtube, https://www.youtube.com/watch?v=rdcSAM74Oh4, Feb. 25, 2013, 1 page.

National Aeronautics and Space Administration, Museum in a Box Series, "Parts of an Airplane", EP-2010-12-467-HQ , (available at https://www.hq.nasa.gov/office/aero/pdf/parts_of_an_airplane_9-12.pdf), 26 pages, 2010.

Pilot's Handbook of Aeronautical Knowledge "Chapter 6: Flight Controls" (available at https://www.faa.gov/regulations_policies/handbooks_manuals/aviation/phak/media/08_phak_ch6.pdf), 12 pages, Feb. 10, 2017.

SKYbrary Wiki, "Spoilers and Speedbrakes" (available at https://web.archive.org/web/20180408205808/https://skybrary.aero/index.php/Spoilers_And_Speedbrakes ), 4 pages, Apr. 8, 2018.

Wikipedia, "Flap (aeronautics)" (available at https://en.wikipedia.org/w/index.php?title=Flap_(aeronautics)&oldid=998692496, 9 pages, Jan. 6, 2021.

* cited by examiner

SPLIT-FLAP WING ASSEMBLY FOR A HIGH ENDURANCE AIRCRAFT

CROSS REFERENCE TO RELATED APPLICATIONS

This application claims the benefit of U.S. Provisional Application No. 62/983,958 filed. Mar. 2, 2020, the disclosure of which is incorporated herein by reference in its entireties.

FIELD OF THE INVENTION

The present invention relates to spoilers and flaps in aircrafts.

BACKGROUND OF THE INVENTION

With the advent of airplanes, it has long been the goal and the trend for engineers to monitor, optimize, and improve upon established notions of flight. In the field of aeronautics, many factors come into play when it comes to solving problems prevalent in the field. These factors generally depend upon benefits associated with solving a given problem, but can also depend upon the type or purpose of an aircraft, and other economic considerations as applicable. Some improvements that have been pursued by engineers include increasing the speed or load capacity of the aircraft, if for example the aircraft's primary purpose is to carrying passengers or cargoes in which case there may be a need for passengers or cargo to reach their destinations faster, Here, improvements were usually focused on addressing aerodynamic aspects that sought to provide friction-less trajectories, or aircraft engine efficiency, among other aspects.

With regards to acrobat pilots and their aircrafts, the improvements have rather been distinct. These improvements were focused on addressing needs associated with manipulating a given net weight of an aircraft to provide better maneuverability, or otherwise addressing overall aerodynamic design of the aircraft to provide better laminar airflow surrounding the aircraft. Improvements have also nevertheless been directed to increasing the speed of the aircraft in these cases.

In the military field, the needs have been related to reconnaissance missions, combat missions, ration transport missions, or general surveillance missions. In these cases, these improvements were directed to addressing more minute aspects such as those of achieving, for example, noiseless and vibration-less improvements in the aircraft that may better serve in missions related to reconnaissance or ration transport or surveillance. The speed, net weight, or engine efficiency are also significant needs in military applications.

With respect to aircraft components, each have their own purpose and use. These components generally include the fuselage which comprises the cockpit section, passenger or cargo or equipment section, all of which may be used for case-specific missions; empennage at the tail of the aircraft which further can comprise stabilizers, the rudder, and the elevator; wings or airfoils which provides the highest amount of lift to an aircraft and which further may comprise components like ailerons, flaps, spoilers, slats, like control surfaces, aerodynamic surfaces, auxiliary airfoils, etc. The engine, which is usually situated at the wings for passenger aircrafts, may depend on the type of the aircraft in question. These components have various functions and if a need arises around those functions, it generally is the case that the improvement may only be addressed to that component. It is also true that multiple components can be affected and changed in order to address a particular need.

One of the main subjects of improvement in the field of aircrafts has been directed towards aircraft control. There have been many improvements directed to aircraft components including those involving ailerons, flaps, elevators, airfoils, and stabilizers. For example, some of these improvements have been disclosed in the following US Patents/Patent Publications: U.S. Pat. Nos. 2,791,385, 2,612,329, 6,079,672, 6,554,229 B1, U.S. Pat. No. 7,510,151 B2, U.S. Pat. No. 7,520,471 B2, U.S. Pat. No. 8,418,954 B2, U.S. Pat. No. 8,418,968 B2, U.S. Pat. No. 8,651,430 B2, U.S. Pat. No. 9,016,638 B2, U.S. Pat. No. 9,403,564 B1, U.S. Pat. No. 9,555,875 B2, U.S. Pat. No. 9,846,432. B2, U.S. Pat. No. 9,873,502 B2, the disclosures of all of the foregoing are incorporated by reference in their entireties.

Man has generally looked into naturally occurring phenomena to solve engineering problems. In the field of aircrafts, this has been birds. More particularly relevant to our case is the albatross which is supposedly a large high endurance bird with its three and one-half meter wingspan. Adult albatrosses can glide for hundreds of miles at a time, reducing their energy requirement for long flights to a minimum. While large unmanned aerial vehicles (UAVs) like the RQ-4 Global Hawk and the MQ-9 Reaper have exploited the endurance factor of the albatross, they lack one key trait of the bird short takeoff and landing capabilities. Like most birds, the albatross can land in less than one foot while the MQ-9 Reaper can take approximately three thousand feet of ground roll to conic to a complete stop. Even if the MQ-9 was scaled down to the size of the albatross, it would still take five hundred feet to stop. Moreover, improvements in the current art have not yet properly and effectively addressed the problem of aircrafts taking a longer distance both during landing and take-off.

Fowler flaps are a type of slotted flap. This flap design not only changes the camber of the wing, it also increases the wing area. Instead of rotating down on a hinge, it slides backwards on tracks. In the first portion of its extension, it increases the drag very little, but increases the lift a great deal as it increases both the area and camber. As the extension continues, the flap deflects downward. During the last portion of its travel, the flap increases the drag with little additional increase in lift. A more detailed explanation of a fowler flap can be found at https://www.faa.gov/regulations_policies/handbooks_manuals/aviation/phak/media/08_phak_ch6.pdf; the disclosure of which is incorporated by reference in its entirety.

Further detailed description of aeronautical flaps is provided in Wikipedia, the free encyclopedia, at https://en.wikipedia.org/wiki/Flap_(aeronautics), the disclosure of which is incorporated by reference in its entirety. FIG. 16 herein provides illustrations for various types and styles of flaps known in the art.

An improvement addressing this problem by substantially reducing the distance it takes for an aircraft to take-off or land can prove immensely useful both for military-purpose aircrafts and civilian-purpose aircrafts. For example, on the military side, having a shorter take-off and landing can mean that a surveillance aircraft or a reconnaissance aircraft can directly benefit from being able to retreat faster even if it has been caught by an enemy radar, in that they can take-off fast and speed away from enemy lines. On the civilian side, this can mean that passengers suffering from taxi-sickness may be better served by less taxi-time. In addition, having a shorter time for take-off and landing affords an aesthetic benefit to the ideal engineer who may wish to add "technical elegance" to his design.

There is, thus, a need for shorter times for aircraft take-off and landing that has wider applications than is currently known, and the current invention seeks to address that need.

SUMMARY OF THE INVENTION

The present invention provides an improvement in a device and method for aircrafts to take-off from runways and land on runways in a shorter duration of time.

The present invention provides a split-flap wing assembly for a high endurance aircraft. The wing assembly comprises a wing, a flap and flap sweep members. The wing includes an upper surface, a lower surface with a flap frame, a camber line, and a flap sweep hinge disposed along a forward edge of the flap frame. The flap includes a control surface, an interior surface, a forward edge, and a trailing edge. One or more flap hinge defines a lateral pivot axis of the flap, with the pivot axis positioned at or rearward of the forward edge. One or more flap sweep member is provided, having a length, with the flap sweep member having a forward end attached for pivoting at the flap sweep hinge, and a rearward end attached pivotally to the flap hinge. The flap sweep member is pivotable to a deployment angle from a neutral sweep position at which the rearward end of the flap sweep member is farther away from the camber line of the airplane wing than at the neutral position. The flap can have a flap deployment angle, relative to a neutral flap position, dependent in part on the deployment angle of the flap sweep member. The flap sweep member in an active position provides a slot having a gap distance between the flap frame and the forward edge of the flap, to allow airflow from along the lower surface of the wing to flow through the slot and to the interior surface of the flap.

In an embodiment, the wing assembly comprises two or more flap hinges, and two or more flap sweep members.

In an embodiment, the flap pivots at a flap pivot angle about the lateral pivot axis.

In an embodiment, the gap distance of the slot increases with the increase in outward angle of the flap sweep member.

In an embodiment, the deployment angle of the flap is dependent only on the deployment angle of the flap sweep member.

An embodiment of the present invention can also include a flap sweep pivoting means for pivoting the forward end of the one, two or more flap sweep members at the one, two or more flap sweep hinges.

In an embodiment, the flap can pivot to a flap pivot angle, relative to the flap sweep member, between a neutral flap position and a passive flap position at an inward angle from its neutral flap position, with the trailing edge nearer to the camber line of the airplane wing than when the flap is at the neutral flap position. The flap can have a deployment angle, relative to the camber line of the wing, dependent on both the deployment angle of the flap sweep member and the flap pivot angle.

In an embodiment, a gap distance of the slot is dependent upon both the deployment angle of the flap sweep member and the flap pivot angle.

An embodiment of the present invention can also include a flap pivoting means for pivoting the flap at the flap hinges.

In an embodiment, when the lateral pivot axis of the flap is rearward of the forward edge of the flap, the gap distance of the slot increases with an increase in inward flap pivot angle. The wing can include one, two or more flap sweep hinges and one, two or more flap sweep members, the flap includes one, two or more flap hinges positioned along opposite ends of the lateral pivot axis. The one, two or more flap sweep members is configured to pivot, to an outward angle of up to about 60 degrees. The flap is configured to pivot to an inward flap pivot angle of up to about 60 degrees.

An embodiment of the present invention can also provide the flap further pivoting between a neutral flap position and an active flap position at an outward flap pivot angle from the neutral flap position, with the trailing edge further from the camber line of the airplane wing than when the flap is at the neutral flap position.

An embodiment of the present invention can also provide a spoiler frame, and the wing further includes a spoiler hinge disposed along a forward edge of the spoiler frame, and a spoiler that includes a control surface, an interior surface, a forward hinge edge, and a trailing edge, the spoiler hingedly connected at the forward hinge edge to the spoiler hinge for pivoting the spoiler within the spoiler frame.

In an embodiment, the spoiler is configured to pivot to an inward deployment angle of up to about 60 degrees, an outward deployment angle of up to about 60 degrees, or both.

DETAILED DESCRIPTION OF THE INVENTION

Figure 1:
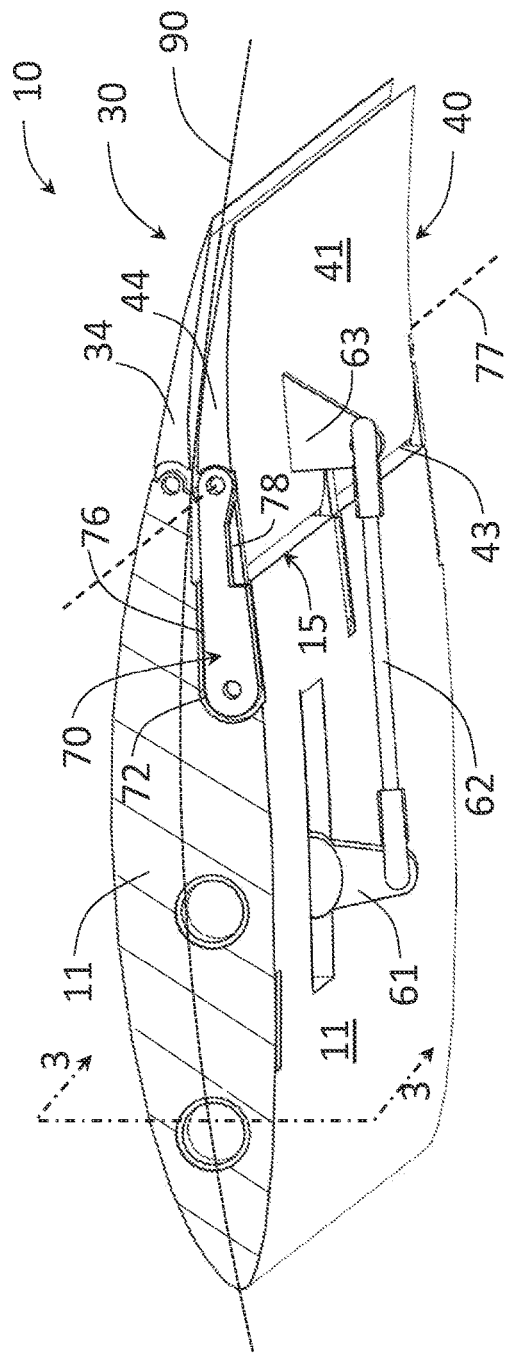
FIG. 1 illustrates a perspective view of a section of a wing assembly having an adjustable split-flap having a flap sweep member for pivotably extending a flap.

Disclosed herein are embodiments of wing assemblies that affect the lift and drag of aircrafts so that runway time during take-off and runway time during landing is reduced. This detailed description initially sets forth definitions of terms, used herein, that are well-known in the aircraft industry, or to a person skilled in the art. Following that is set forth the invention in detail with respect to figures presented herein.

Definitions

As used herein, "airfoil" refers to the cross-sectional shape of a wing of an aircraft.

As used herein, an "active" position of a flap or spoiler refers a position thereof at which the trailing edge of the flap or spoiler is pivoted away from the camber line.

As used herein, "angle of attack" refers to the angle between the chord line of an aircraft and the vector representing the relative motion between the wing and the air through which it is moving.

As used herein, "camber" refers to the asymmetry between two acting surfaces of an airfoil, with an upper surface of a wing being more convex than the lower surface of the wing.

As used herein, "camber line" refers to a curve line that occurs halfway between the upper surface and the lower surface of the airfoil.

As used herein, "chord line" refers to an imaginary straight line joining the leading and trailing edges of an airfoil.

As used herein, "chord span" refers to a percentage of the chord line covered by the control surfaces of a spoiler and a flap.

As used herein, a "control surface" refers to an outer surface of a wing, flap or spoiler, farther away from the camber line of the wing than an opposed inner surface.

As used herein, "control surface-based aircraft components" refers to aerodynamic devices that allow a pilot to adjust and control the aircraft's flight and include devices like ailerons, flaps, slats, rudder, and elevators.

As used herein, "drag" refers to a force acting opposite to the relative motion of any object moving with respect to a surrounding fluid (this is sometimes called air resistance, a type of friction, or fluid resistance, another type of friction or fluid friction).

As used herein, "flap" refers to a type of high-lift device used to increase the lift of a vehicle wing at a given speed, an embodiment of a fixed-wing aircraft, these flaps are mounted on the wing's trailing edges.

As used herein, "fuselage portion" refers to an aircraft's main body section that generally accommodates the crew, passengers, or cargo.

As used herein, "high endurance aircraft" refers to aircrafts that are capable, for various reasons, of gliding or traversing for longer periods of time in the air as opposed to other aircrafts.

As used herein, "lift" refers to a force acting perpendicular to the flow of a fluid.

As used herein, "neutral" position refers to a rest position of a given spoiler or a given flap, or of an element associated with a flap or spoiler, including a position where their respective control surfaces are coextensive with corresponding surfaces of a given airplane wing.

As used herein, an "passive" position of a flap or spoiler refers a position thereof at which the trailing edge of the flap or spoiler is pivoted across the camber line.

As used herein, "spoiler" refers to a type of device intended to intentionally reduce the lift component of an airfoil in a controlled manner.

As used herein, "taxi" refers to the movement of an aircraft on the ground, under its own power, in contrast to towing or push-back where the aircraft is moved by a tug.

FIGS. 1-4 show an embodiment of a wing assembly 10 for a high endurance aircraft. The wing assembly 10 includes an airplane wing 11, a spoiler 30, and a flap 40 while the airplane wing 11 includes an upper surface 12, and a lower surface 14. The airplane wing 11 is typically attached to the fuselage portion of the aircraft and can include various aerodynamic components such as ailerons, flaperons, slats, auxiliary airfoils etc. that may share control surfaces with the upper surface 12 and the lower surface 14. The length of the airplane wing 11 can depend upon the nature, type, and/or purpose of the aircraft in question. In the embodiment shown, the upper surface 12 and the lower surface 14 have similar shapes with regards to their surfaces. The surface areas of the upper surface 12 and the lower surface 14 can be equal in terms of their contact with air during a given airflow scenario. In other embodiments, the upper surface 12 and the lower surface 14 can have different shapes, and their surface areas that have contact with air can also be different.

Figure 2:
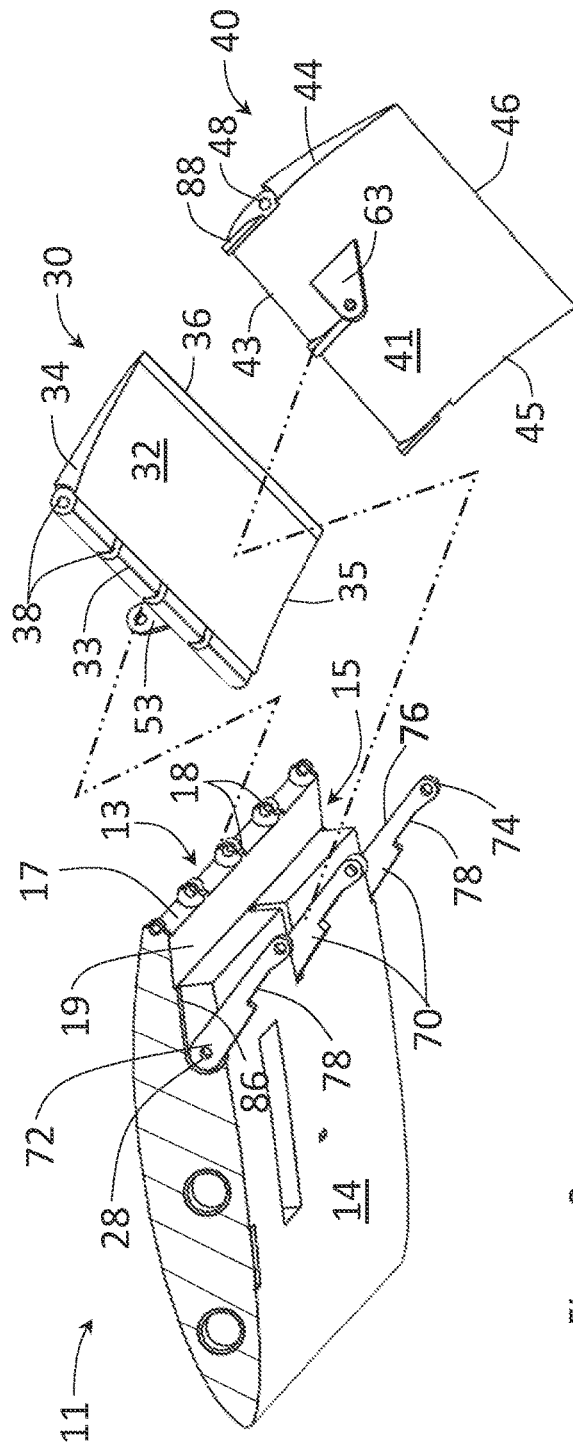
FIG. 2 illustrates an exploded underside perspective view of the wing assembly, with the spoiler and the flap illustrated separately from the wing.

The spoiler 30 and the flap 40 are shown in FIG. 2 separately from the airplane wing 11 for illustration purposes. The airplane wing 11 includes a spoiler frame 13 and a flap frame 15. The spoiler frame 13 has a forward edge 17. For illustration of the invention, inboard and outboard side edges of the spoiler frame are not shown.

The spoiler frame is a frame-like structure within the upper surface of the airplane wing 11, in which the spoiler 30 registers and remains registered in a neutral spoiler position. The spoiler 30 is hingedly connected to the airplane wing 11 by means of a spoiler hinge 18 disposed along the forward edge 17 of the spoiler frame 13. The spoiler 30 is defined by two surfaces and four peripheral edges. The two surfaces include a control surface 31 that is outward-facing from the wing interior, and an interior surface 32, while the four peripheral edges include a forward hinge edge 33, an inboard lateral edge 34, an outboard lateral edge 35, and a trailing edge 36. Air flows over the control surface 31 to affect a respective lift component or a drag component of the airplane wing 11. The forward hinge edge 33 of the spoiler 30 confronts and communicates hingedly with the forward edge 17 of the spoiler frame 13 through a spoiler hinge means, formed between a plurality of spoiler hinges 38 of the spoiler, and a plurality of mating hinge members 18 of the spoiler frame. In a neutral spoiler position, the inboard lateral edge 34 and the outboard lateral edge 35 of the spoiler 30 confront the inboard side edge and the outboard side edge of the spoiler frame 13, respectively (not shown). A spoiler deployment angle line β (beta) passes through the spoiler hinge 38 at the neutral spoiler position of the spoiler 30. The control surface 31 of the spoiler 30 is also coextensive with the upper surface 12, and the trailing edge 36 is typically coextensive with the trailing edge 9 of the airplane wing 11, in the same neutral spoiler position.

Like the spoiler frame 13, the flap frame 15 is defined by a forward edge 19 (FIG. 2). For illustration of the invention, inboard and outboard side edges of the flap frame are not shown. The flap frame 15 is a frame-like structure within the lower surface of the airplane wing 11, in which the flap 40 registers and remains registered in a base neutral position, shown in FIGS. 1 and 3.

The flap 40 is defined by two surfaces and four peripheral edges. The two surfaces include a control surface 41 which is outward-facing from the wing interior, and an interior surface 42, while the four peripheral edges include a forward hinge edge 43, an inboard lateral edge 44, an outboard lateral edge 45, and a trailing edge 46. Air flows over the control surface 41 to affect a respective lift component or a drag component of the airplane wing 11. The forward hinge edge 43 of the flap 40 confronts and communicates with the forward edge 19 of the flap frame 15. The control surface 41 of the flap 40 is coextensive with the lower surface 14, and the trailing edge 46 is coextensive with a trailing edge of the airplane wing 11, in the same neutral flap position. When both the spoiler 30 and the flap 40 are in their respective neutral positions, the interior surface 32 of the spoiler 30, including the trailing edge 36, and the interior surface 42 of the flap 40, including the trailing edge 46, confront each other. The forward edge 19 of the flap frame 15 is disposed forward, along the camber line 90, of forward edge 17 of the spoiler frame 13. To account for the displacement of the forward edge 19, the longitudinal length of the flap 40, from the forward edge 43 to the trailing edge 46, is greater than the length of the spoiler 30, from the forward edge 33 to the trailing edge 36. A pair of pivotable flap hinges 48 are positioned at or rearward of the forward edge 43 of the flap 40, with a flap hinge 48 fixed along the opposed inboard and outboard lateral edges 44,45.

A lateral flap pivot axis 77 extends parallel with the forward edge 43 of the flap and through the pivotable flap hinges 48. In the illustrated embodiment, the flap hinge 48 is fixed along the inboard and outboard lateral edges 44,45 with the flap pivot axis 77 spaced apart from the forward edge 43. In other embodiments, the flap pivot axis 77 is displaced from the forward edge 43 at least about 10%, for example at least 20% or at least 30%, and up to about 50%, for example, up to about 40%, of the chord distance. In another embodiment, the flap hinge 48 is fixed at the forward end 43 of the flap 40.

Figure 3:
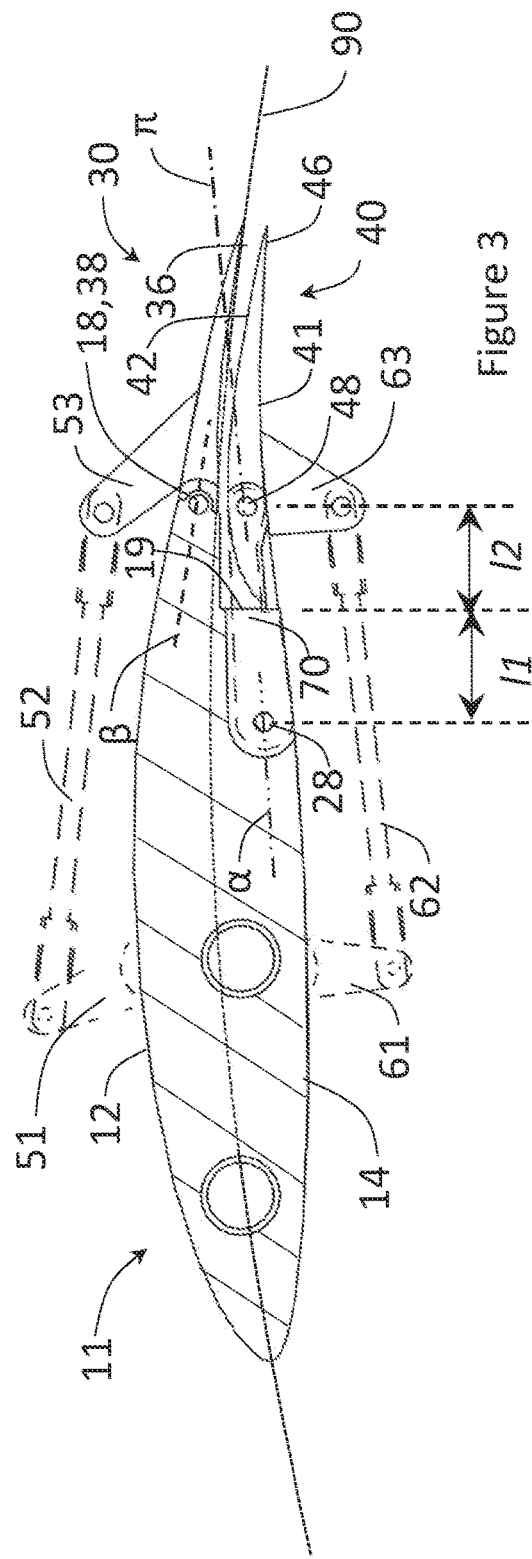
FIG. 3 illustrates a sectional view of the wing assembly of FIG. 1, viewed along line 3-3 of FIG. 1.

In the illustrated embodiment, the pivotable hinge members can comprise a cylindrical pin extending laterally from the respective inboard and outboard lateral edges 44,45. In the illustrated embodiment, the flap pivot axis 77 is displaced from the forward edge 43, approximately 25% of the chord distance (the distance from the forward edge 43 to the trailing edge 46) of the flap 40. As shown in FIGS. 1 and 3, the flap hinge 48 of the flap 40 and the spoiler hinge 38 of the spoiler 30 are substantially vertically aligned, and consequently, the positioning of the flap hinge 48 rearward of the flap forward edge 43 is approximately the same distance as the distance of the flap frame forward edge 19 from the spoiler frame forward edge 17.

The wing assembly 10 also includes one, two or more flap sweep members 70. Each flap sweep member 70 has a length, a forward end 72, and a rearward end 74. The forward end 72 of the flap sweep members 70 is fixed (made unitary) to one of the flap sweep hinges 28, and the rearward end 74 is fixed to one of the flap hinges 48. A flap actuator (not shown), is incorporated in the body of the wing 11 and provides a flap sweep pivoting means. The flap actuator mechanically or electromechanically rotates (applies torque to) the flap sweep hinges 28, to pivot the flap sweep member 70 around the axis 75 of the flap sweep hinges 28. The flap sweep member 70 is pivoted between a neutral sweep position, and an active sweep position at which the flap sweep members 70 are at an outward angle from its neutral sweep position, with the rearward end 74 of the flap sweep member 70 farther away from a camber line 90 of the airplane wing 11 than at the neutral sweep position. In one embodiment of the invention, the flap actuator drives the plurality of flap sweep hinges 28 at the same time, to pivot all of the flap sweep members 70 in unison.

The length of the flap sweep member 70 positions the flap sweep hinges 28 forward longitudinally of the flap frame forward edge 19. As shown in FIG. 3, the length of the flap 40 from the flap hinge 48 in the rearward end 74 of the flap sweep member 70 is the sum of the distance l1 from the flap frame forward edge 19 to the flap sweep hinges 28 plus the distance l2 from the flap forward edge 43 rearwardly to the flap hinge 48. The distance l1 provides the flap sweep member 70 with a means for spacing the flap forward edge 43 away from the flap frame forward edge 19 when the flap sweep member 70 is deployed to the neutral flap position.

FIGS. 1-3 illustrate the flap sweep members 70 at their neutral sweep positions and the flap 40 at its base or neutral flap position. In the neutral flap position, an upper surface 76 of each flap sweep member 70 is positioned in confronting relation to an interior surface 86 of the flap frame 15 of the wing 11 (see FIG. 2), providing a flap frame stop. A deployment angle line α (alpha) of the flap 40 passes through the flap sweep hinge 28 at the neutral sweep position of the flap sweep member 70. As shown in FIG. 3, in the neutral sweep position, the flap sweep member 70 is incapable of pivoting upward and across the camber line (counterclockwise in FIG. 3), constrained by the flap frame stop 86.

The flap 40 is configured to be pivoted around the flap pivot axis 77, where the flap 40 can be pivoted relative to the rearward end 74 of the flap sweep member 70. The flap 40 can be pivoted independently of the position or angular movement of the flap sweep members 70. In the illustrated embodiment, the flap 40 has a neutral flap position (deemed a flap deployment angle of zero degrees) at which the flap 40 cannot pivot the trailing edge 46 of the flap 40 downward and away from the camber line 90 (clockwise in FIG. 5), to an active flap position. A flap deployment angle line π (pi) passes through the flap hinge 48 at the neutral flap position of the flap 40. The lateral sides of the flap 40 at the forward end 43 includes a laterally-extending ledge 88, which engages a recess 78 on the underside of the flap sweep member 70, as a flap stop.

Figure 4:
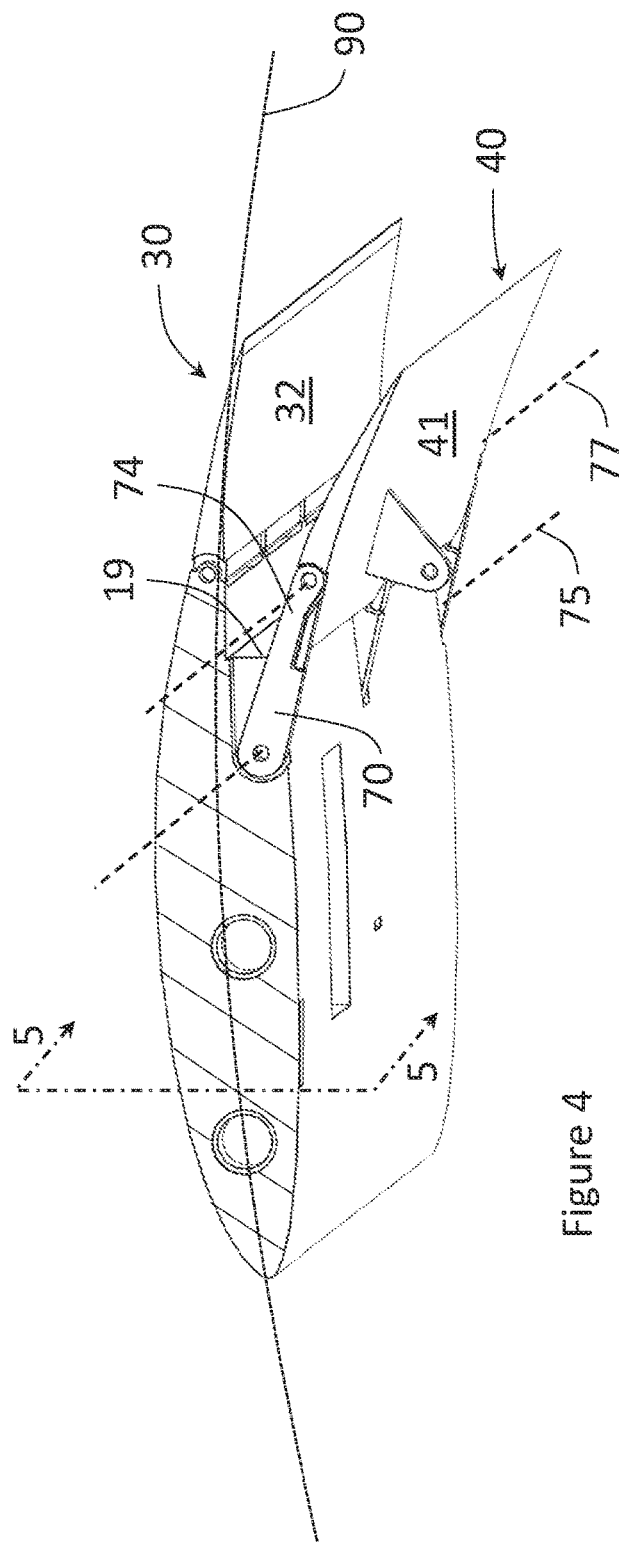
FIG. 4 illustrates the wing assembly of FIG. 1, with the flap sweep member deployed to an active sweep position.
Figure 5:
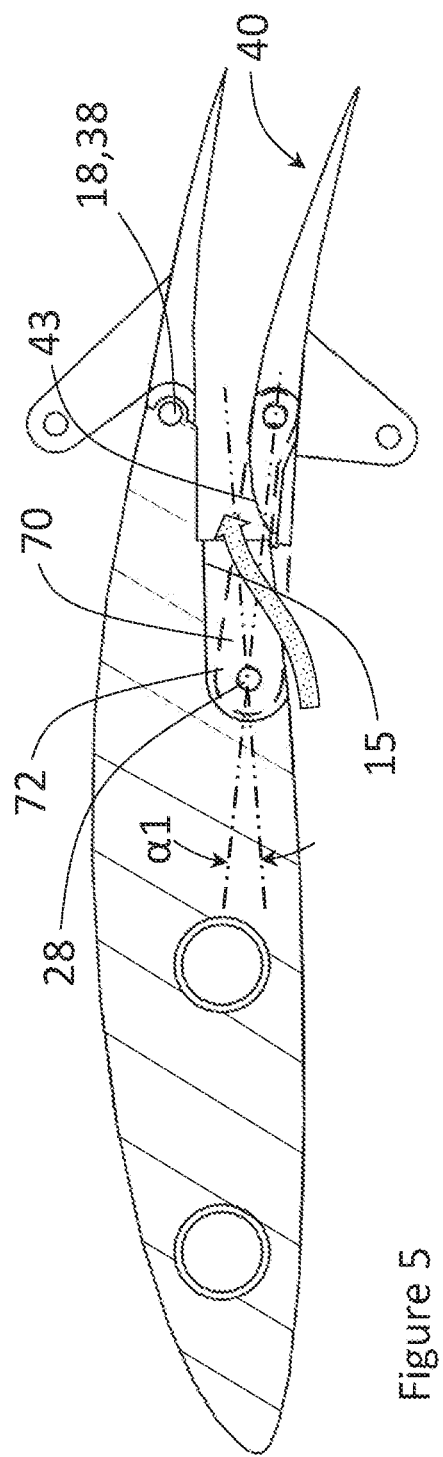
FIG. 5 illustrates a sectional view of the wing assembly of FIG. 4, viewed along line 5-5.

FIGS. 4 and 5 illustrate the flap sweep members 70 deployed to a first, small outward deployment angle α1 of about 5 degrees from its neutral sweep position (which is deemed an outward angle of zero degrees). As seen in FIG. 4, the rearward end 74 of the flap sweep member 70 is pivoted farther away from the camber line 90 of the airplane wing 11 than at the neutral sweep position. In FIG. 5, the flap sweep member 70 is shown in dashed-line silhouette, to illustrate the change in positioning of the forward edge 43 of the flap 40 and the forward edge 17 of the flap frame 15.

Figure 6:
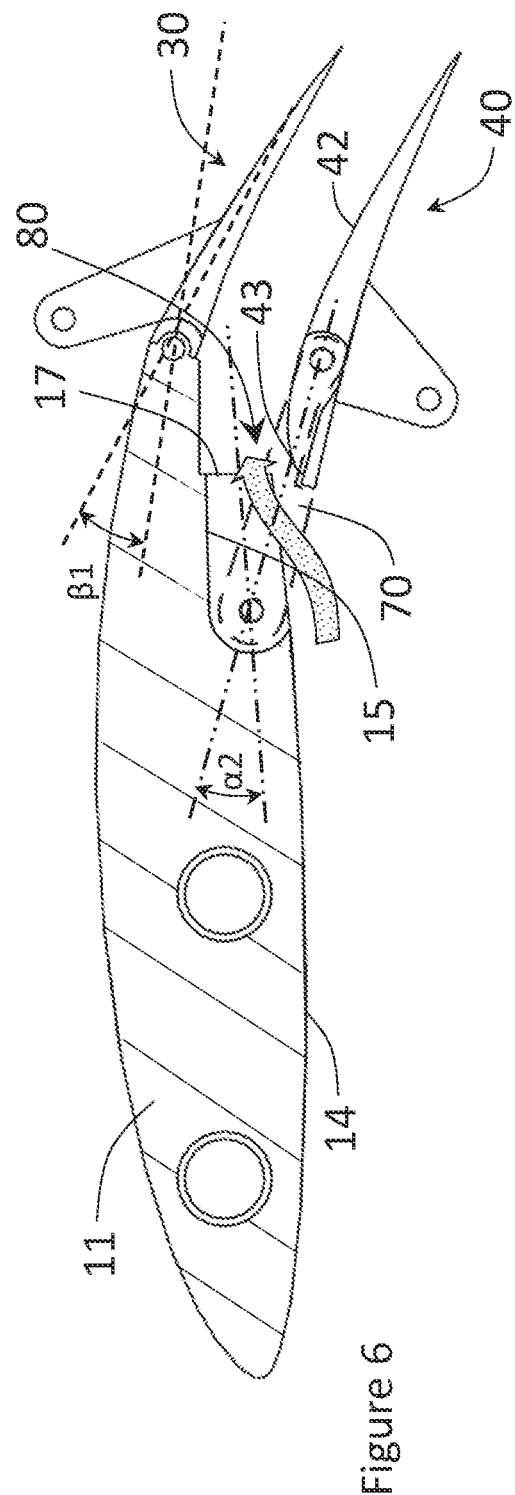
FIG. 6 illustrates the wing assembly of FIG. 4, with the flap sweep member deployed to an active sweep position at which a slot is formed by the split flap, and the flap deployed in a neutral flap position.
Figure 7:
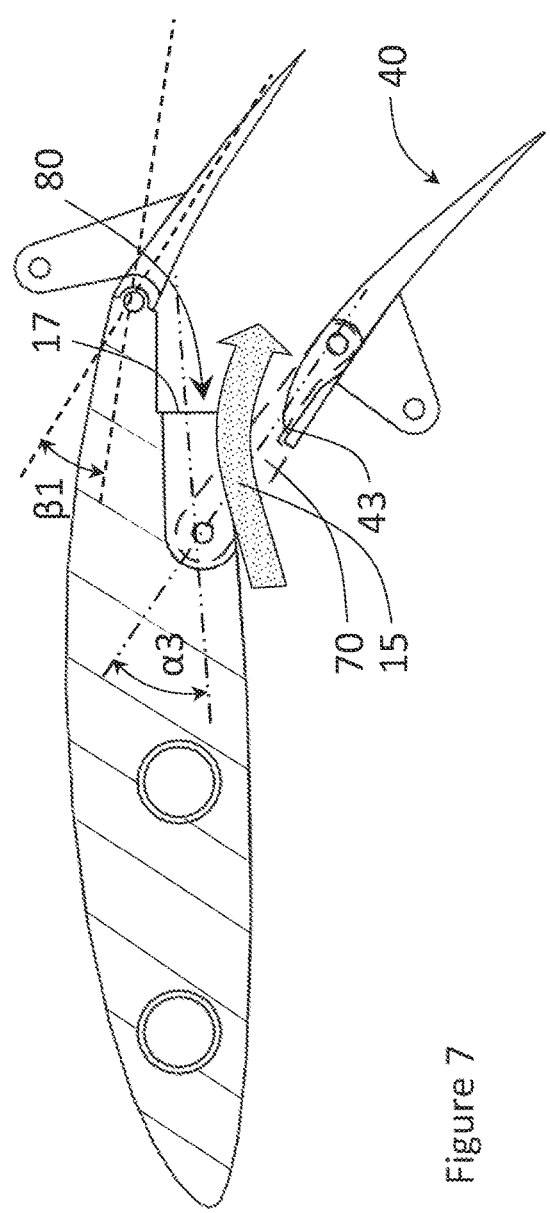
FIG. 7 illustrates the wing assembly of FIG. 6, with the flap sweep member deployed to an active sweep position at which a larger slot is formed by the split flap.

FIG. 6 illustrates the flap sweep members 70 deployed to a second outward angle α2 of approximately 10 degrees, at which a slot 80 has been formed between the forward edge 43 of the flap 40 and the forward edge 17 of the flap frame 15. The slot 80 extends laterally along the width of the flap 40, with a gap distance between the forward edge 43 of the flap 40 and the forward edge 17 of the flap frame 15 that increases with an increase in the outward angle α of the flap sweep member, with the wing 11 functioning as a split-flap wing. The slot 80 allows airflow from along the lower surface 14 of the wing 11 to flow through the slot 80 and to the interior surface 42 of the flap 40. FIG. 7 illustrates the flap sweep members 70 deployed to a third outward angle α3 of approximately 40 degrees, at which the slot 80 between the forward edge 43 of the flap 40 and the forward edge 17 of the flap frame 15 is correspondingly larger.

A flap actuator, as a flap deployment means, is incorporated in the body of the wing 11, that mechanically or electromechanically drives the flap 40, between a neutral flap position and an active flap position at which the flap 40 is at an inward angle π1 from its neutral flap position with the trailing edge 46 closer to the camber line 90 of the airplane wing 11 than at the neutral flap position.

In the illustrated embodiment, the flap 40 is pivoted about the flap pivot axis 77 by actuating a flap control arm 61 extending through the underside 14 of the wing 11, configured to pivot between a forward position and a rearward position in response to the actuator. The flap control arm 61 connects through a flap connecting link 62 to a flap lever 63 affixed to the underside 41 of the flap 40. The connection point of the flap connecting link 62 to a flap lever 63 is at a position sufficiently distant from the flap pivot axis 77 to provide a fulcrum.

Figure 8:
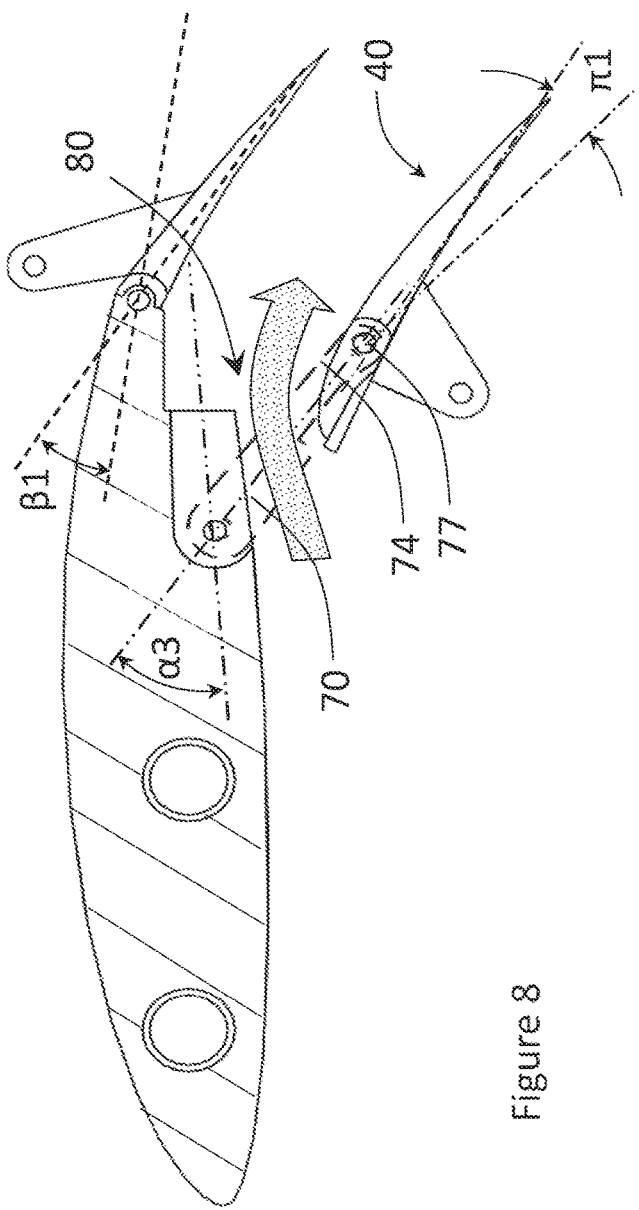
FIG. 8 illustrates the wing assembly of FIG. 7, with the flap deployed to an active flap position at which the slot is further widened.

In some embodiments, the flap 40 can be deployed to an inward flap deployment angle t simultaneously, independently, or sequentially, with deployment of the flap sweep member 70. As shown in FIG. 8, the flap 40 is pivoted to an inward pivot angle of about 10 degrees (−10°), which further pivots the forward end 43 of the flap away from the forward edge 17 of the flap frame 15, thereby further widening the slot 80.

The slot 80 formed between the flap and the flap frame or underside of the wing allows a portion of the air flowing under the wing to flow in between the respective control surfaces, which allows the flap control surface to function as a separate airfoil from the rest of the wing. One benefit thereof is to increase the overall lift generated on the wing. Another benefit is provided for near stall conditions. When a wing is at a high angle relative to the direction of the moving air, the laminar airflow will begin to separate from the wing, preventing it from creating lift. Since the airflow separation begins at the trailing edge of the wing, aileron authority of a hinged control surface is affected when a wing is partially stalled, which could cause a loss of control. Since the flap control surface of the slotted flap system functions as a separate airfoil, airflow separation on the main wing will have a much smaller effect on the lift generation of the flap's control surface.

The spoiler 30 is configured to move either upward or downward, either simultaneously, independently, or sequentially in any order, with the movement of the flap sweep member 70 and/or the flap 40. An example of a spoiler and its features and operation can be found in US Patent Publication 2020-0055585, the disclosure of which is incorporated by reference in its entirety.

In the embodiments illustrated in FIGS. 6 through 8, a spoiler actuator (not shown) drives a spoiler control arm 51, as depicted in FIG. 3, to a rotated position sufficient to generate for the spoiler 30 to a respective deployment angle β1, as needed. The spoiler control arm 51 communicates through the spoiler connecting link 52 to force a spoiler lever 53 and pivot the spoiler 30 about an axis of the spoiler hinge 16.

An actuator can be driven by a motor. In an embodiment of the invention, the motor is a servo motor, and controlled for actuation and positioning via manual or remote control. In other embodiments, the actuators can be connected directly to the spoiler 30 and the flap 40, respectively, without using a connecting link (52,62). The actuators can also be electronic/electrical based, mechanical/hydraulic based. The connecting links (52,62) are elongated and typically have a means for adjusting the length of the link for proper positioning. The levers (53,63) can generally be of any shape and should be rigid and strong to support movement of either the spoiler 30 or the flap 40, depending upon the type of the material that the wing assembly 10 is made of, and more particularly the purpose of the aircraft.

In one embodiment where the wing assembly 10 can form part of a remote-controlled high endurance aircraft, the control system can include individual components such as a receiver, a transmitter, and servo motors. The receiver and the transmitter can be disposed within the aircraft. One servo motor each for the spoiler and the flap on each wing can be used. Thus, four servo motors for an aircraft with two wings can form part of this embodiment. With regards to the functioning of the aircraft, initially, the receiver can interpret radio signals (for e.g. 2.4 GHz, according to some embodiments) from the transmitter (for e.g. based on Spectrum DX7, according to some embodiments) and can send the signals to the servo motors. These could be in the form of pulse width modulation (PWM) for each control input (the spoiler and flap, for instance). The servo motors interpret the signals and turn their control arms to a desired angle (within a one hundred twenty-degree arc, according to some embodiments). In other embodiments, each servo motor's control arm can be connected to their corresponding control surfaces by a stiff wire to pivot the control surface in sync with the servo motor.

Figure 9:
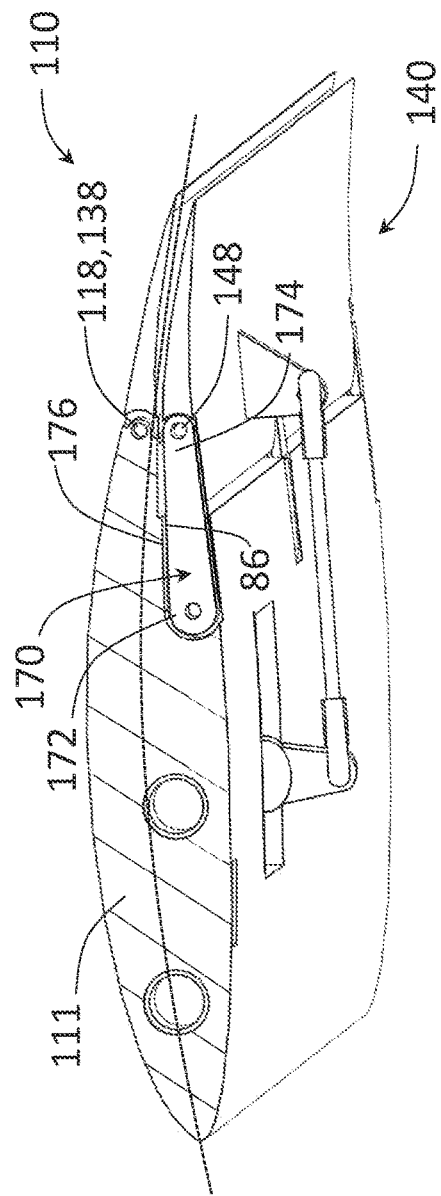
FIG. 9 illustrates a perspective view of a section of another embodiment of a wing assembly.
Figure 10:
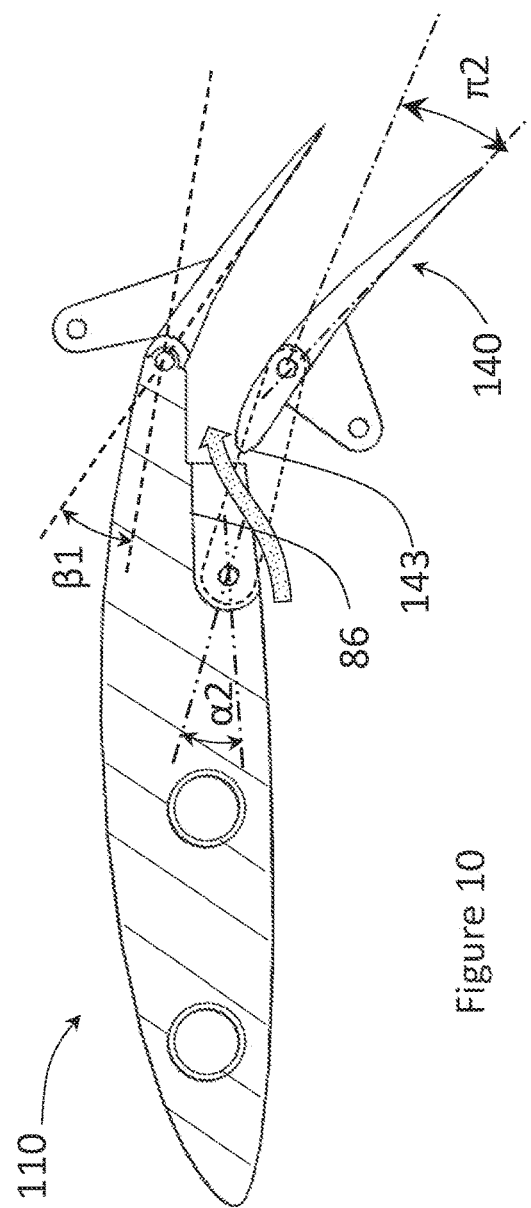
FIG. 10 illustrates a sectional view of the wing assembly of FIG. 9, with the flap deployed to an active flap position.

FIGS. 9 and 10 show another embodiment of a split-flap wing assembly 110 similar to the split-flap wing assembly 10 described above, in which the flap 40 can be deployed to an outward flap pivot angle it simultaneously, independently, or sequentially, with deployment of the flap sweep member 70. The flap sweep element 170 includes has a length, a forward end 172, and a rearward end 174. In the neutral sweep position, an upper surface 176 of each flap sweep member 170 is positioned in confronting relation to an interior surface 86 of the flap frame 15 of the wing 111, providing a flap frame stop.

Figure 11:
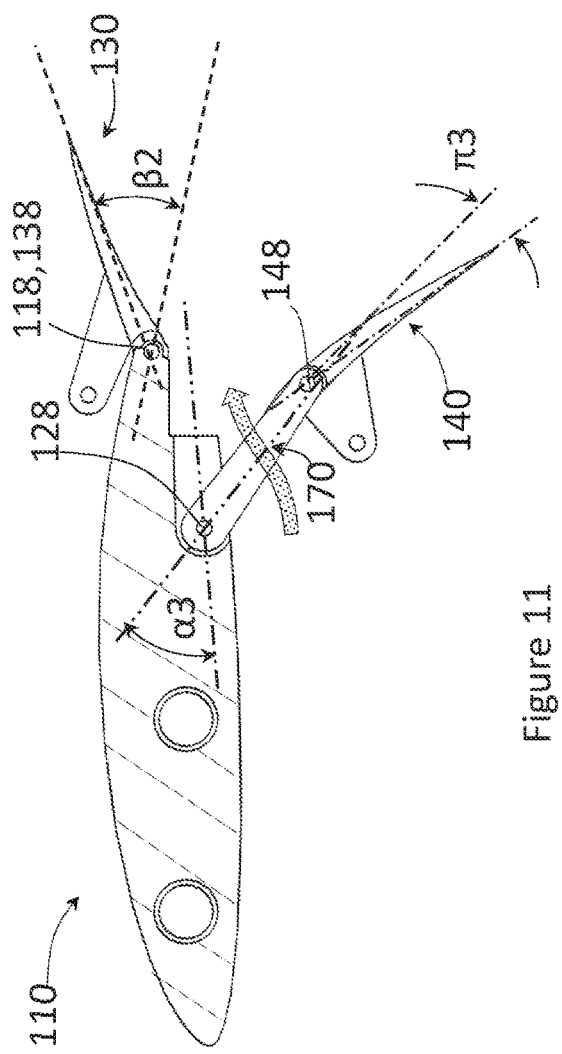
FIG. 11 illustrates the sectional view of the wing assembly of FIG. 10, with the flap deployed to an active flap position and the spoiler deployed to an active spoiler position.

FIG. 11 shows an alternative embodiment of a split-flap wing assembly 110 with the spoiler 130 deployed to an outwardly-rotated or active spoiler position, at a spoiler pivot angle β2 of about 30 degrees (+40°), with the flap sweep member 170 pivoted at the flap sweep hinges 128 to a deployment angle α3 of approximately 40 degrees, and with the flap 140 pivoted to an outward flap pivot angle of 15 degrees (+15°).

The flap 140 is pivoted at the flap hinge 148 to an outward pivot angle π3 of about 10 degrees (+10°), which further deploys the rearward end 46 of the flap away from the camber line 90. The combination of the flap deployment angle α3 and the flap pivot angle π3 positions the flap 140 at an outward deployment angle of about 40 degrees (+40°) from its neutral flap position. Unlike the flap 40 of the earlier embodiment, the forward edge 143 of the flap 140 does not include a laterally-extending ledge (88) that may engage the flap sweep member 170 and limit outward pivoting of the flap 140.

Figure 12:
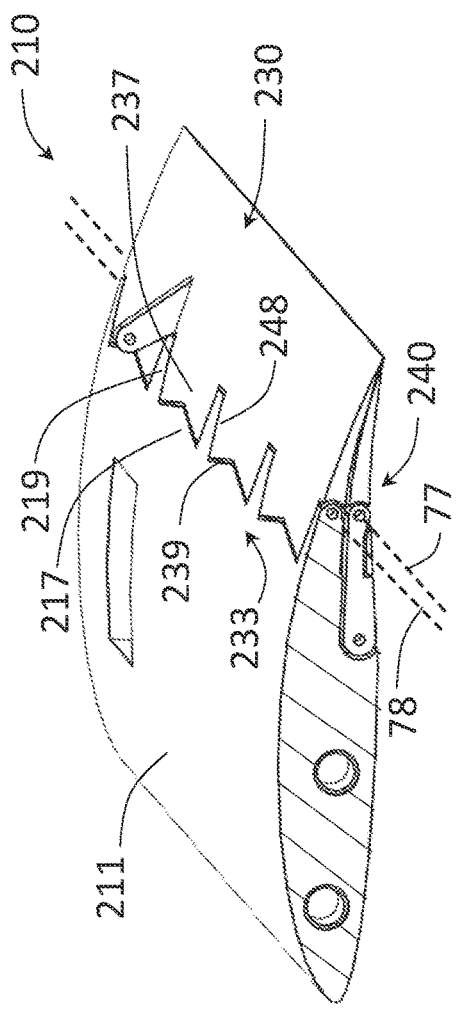
FIG. 12 illustrates a perspective view of a section of another embodiment of a wing assembly having a spoiler with vortex generators along a forward edge.

FIG. 12 illustrates another embodiment of a split-flap wing assembly 210 wherein the spoiler 230 has a spoiler forward edge 233 that is non-linear vortex generator. The spoiler 230 includes a series of forward extending vortex generator blades 237 extended along the spoiler forward edge 233. Each vortex generator blade 237 has opposed lateral sides 248 and a forward edge 239. In the illustrated embodiment, each of the blade forward edges 239 has a V-shaped valley that extends rearward into the blade forward edge 239.

Correspondingly, the spoiler frame 213 in the upper surface 212 of the wing 111 has a non-linear frame forward edge 217 congruent with the spoiler forward edge 233. The forward edge 217 includes a series of a V-shaped ridges that confront the vortex generator blades 237, and rearwardly-extending fingers 219 that extend between the lateral sides 248 of adjacent blades 237. In the neutral spoiler position, the interface of the spoiler forward edge 233 with the frame forward edge 217 is laminar and co-planar, as shown in FIG. 12.

The inclusion of the vortex generator blades 237 provides a spoiler forward edge 233 that has a blade forward edge 239 that extends forward of the spoiler hinges 238.

Figure 13:
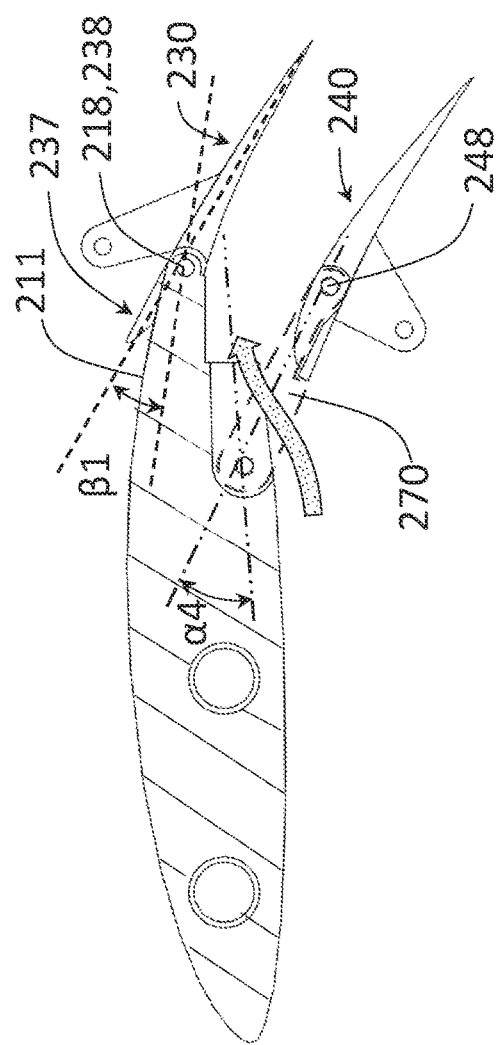
FIG. 13 illustrates a sectional view of the wing assembly of FIG. 12, with the flap sweep member deployed to an active sweep position, the flap deployed in a neutral flap position, and the spoiler deployed to a passive flap position.

FIG. 13 illustrates a side elevation view of the split-flap wing assembly 210 with the spoiler 230 deployed to an inwardly-pivoted position, at a spoiler pivot angle β1 of about minus 30 degrees (−30°), also referred to as a passive spoiler position of the spoiler. The flap sweep member 270 is pivoted at the flap sweep hinges 228 to a deployment angle α4 of approximately 25 degrees, and with the flap 240 at its neutral flap position. The inward deployment of the spoiler 230 results in the spoiler forward edge 233 pivoting outwardly, above the surface 212 of the wing 211, resulting in the generation of turbulence as air passes along the upper surface 212, and over and between the extending forward edges 239 of the vortex generator blades 237.

Figure 14:
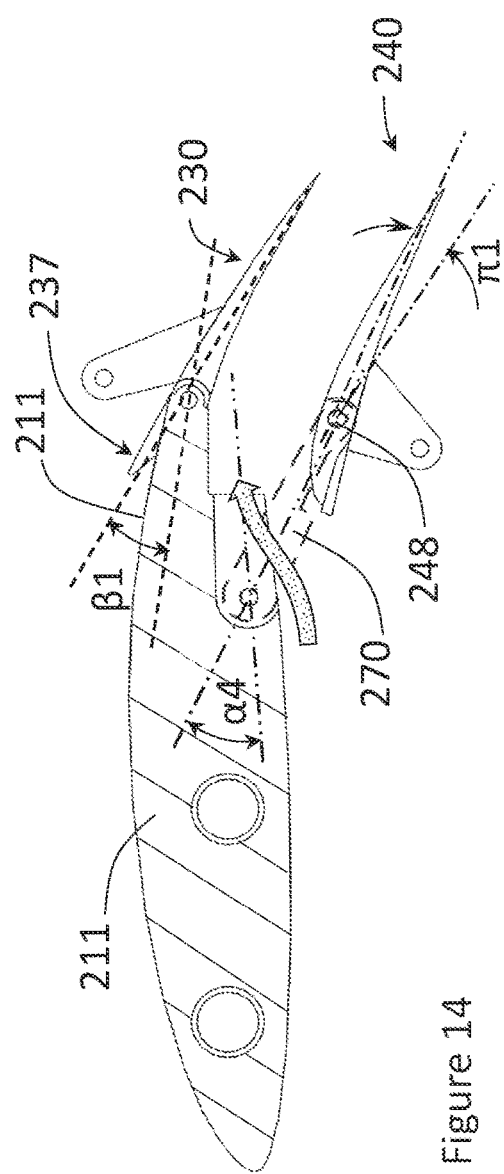
FIG. 14 illustrates the wing assembly of FIG. 13, further with the flap pivoted inwardly to a passive spoiler position, and the spoiler deployed inwardly to a passive flap position.

FIG. 14 illustrates a side elevation view of the split-flap wing assembly 210 with the spoiler 230 deployed to a passive spoiler position, at an inward spoiler pivot angle β1 of about minus 30 degrees (−30°), with the flap sweep member 270 pivoted at the flap sweep hinges 228 to a deployment angle α4 of approximately 25 degrees, and with the flap 240 pivoted inwardly to a flap pivot angle π1 of about 10 degrees (−10°).

In an alternative embodiment, the flap sweep member 270 can be of the design of the flap sweep member 170 shown in FIGS. 9-11, and the flap 240 can be of the design of the flap 140 wherein the forward edge 143 does not include a laterally-extending ledge (88) that may engage the flap sweep member 170, to enable pivoting outwardly of the flap 240 to an active flap position.

Figure 15:
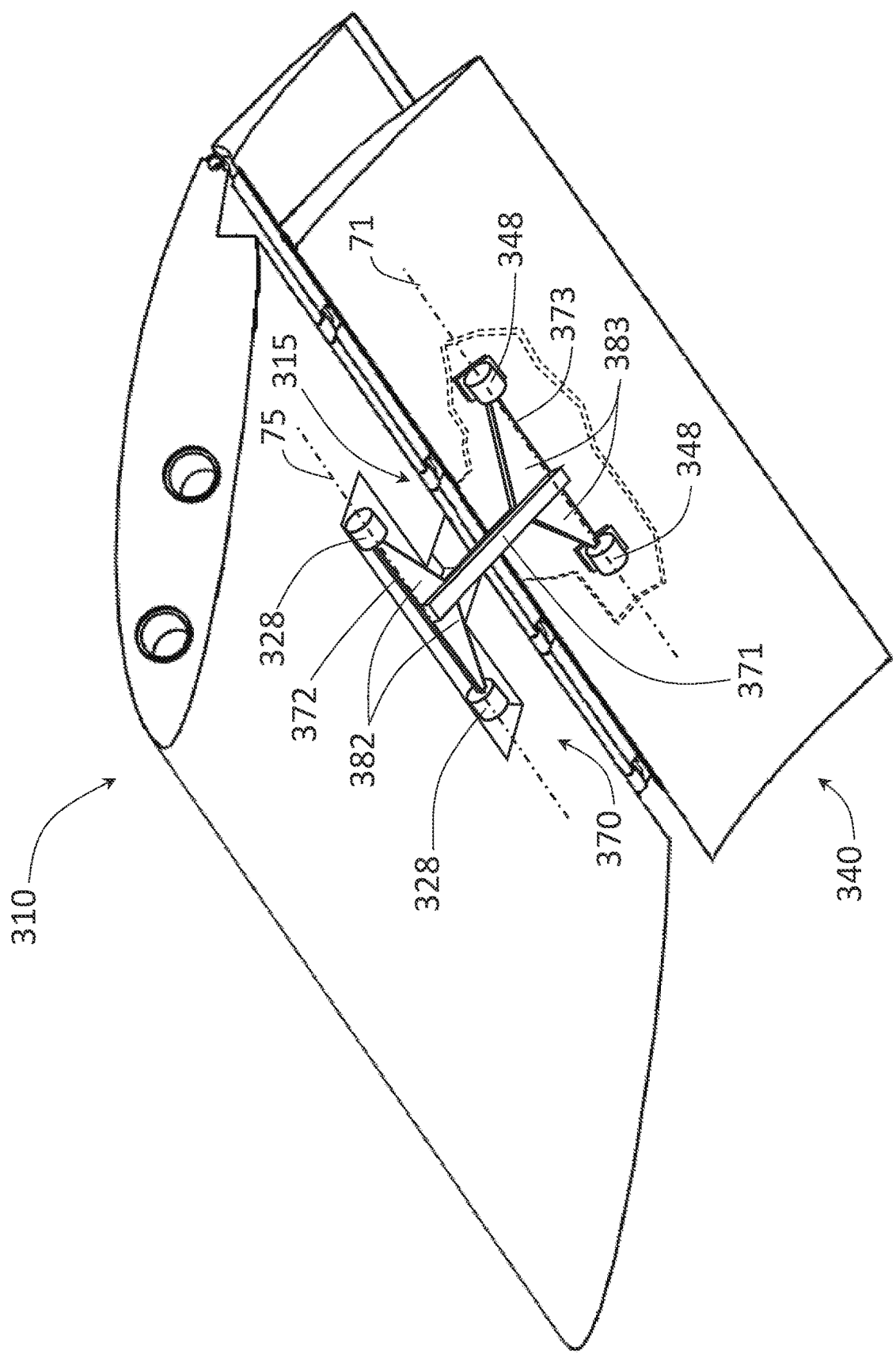
FIG. 15 illustrates an alternative embodiment of a split-flap wing assembly having a single flap sweep member.
Figure 16:
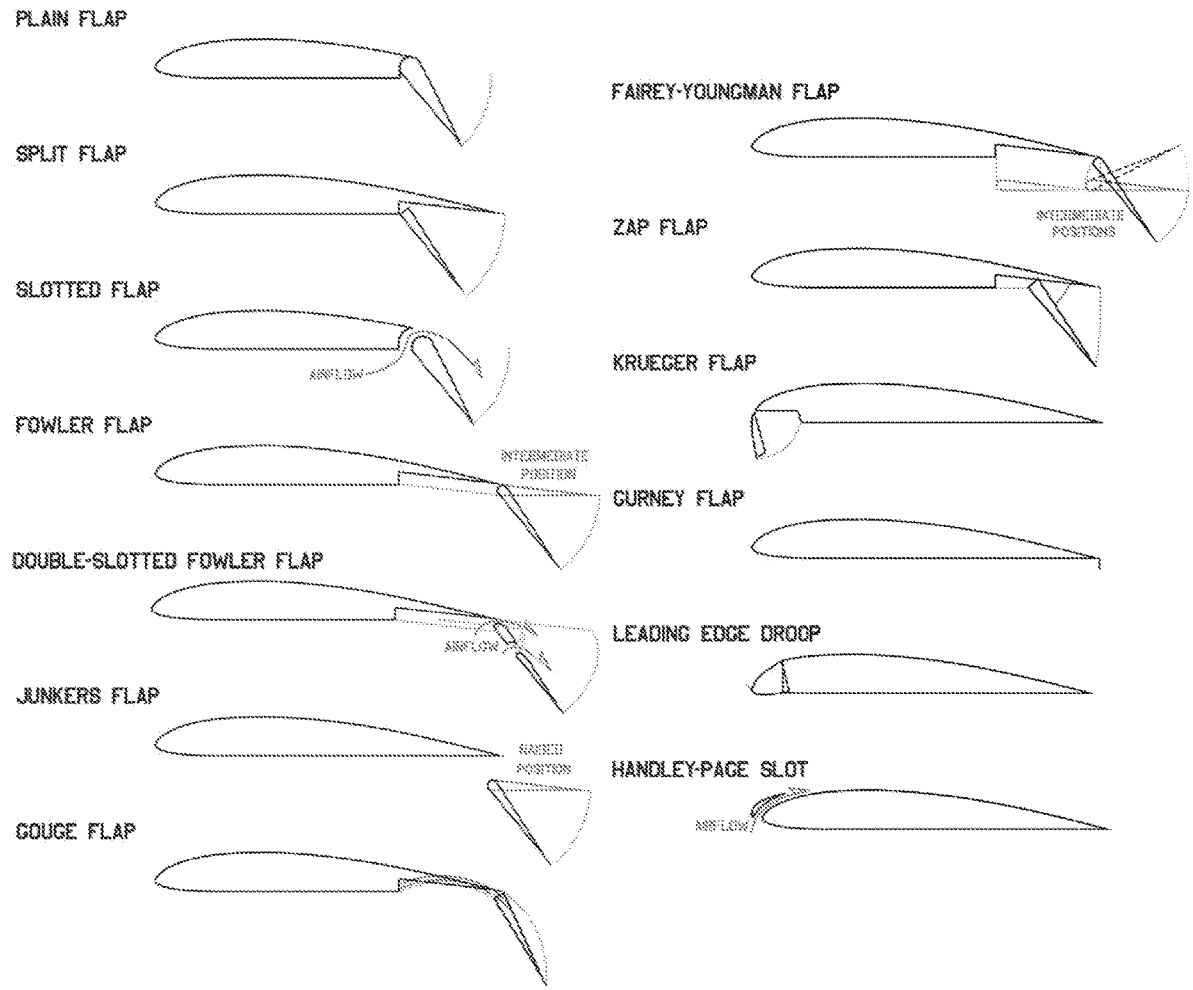
FIG. 16 illustrates various types and styles of flaps known in the art.

FIG. 15 illustrates an embodiment of a split-flap wing assembly having a single flap sweep member 370. The flap sweep member 370 includes an elongated arm 371 and a forward end 372 extending transverse to the arm 371. The opposite ends of the forward end 372 are pivotably attached at respective flap sweep hinges 328 to the flap frame 315, for pivoting the flap sweep member 370 around the lateral axis 75 of the flap sweep hinges 328. Forward braces 382 on opposites sides of the arm 371 connect the arm 371 with the length of the forward end 372, to prevent axial rotation or torquing of the arm 371 relative to the forward end 372. The flap sweep member 370 also includes a rearward end 373 extending transverse to the arm 371. The opposite ends of the rearward end 373 are pivotably attached at respective flap hinges 348 to the flap 340, for pivoting independently the flap 340 around the flap pivot axis 77 of the flap hinges 348. Rearward braces 383 on opposites sides of the arm 371 connect the arm 371 with the length of the rearward end 373, to prevent lateral rotation or torquing of the rearward end 373 relative to the arm 371.

I claim:

1. A split-flap wing assembly for a high endurance aircraft, the wing assembly comprising:
    a wing including an upper surface, a lower surface with a flap frame, a camber line, and one, two or more flap sweep hinges disposed along a forward edge of the flap frame;
    a flap including a control surface, an interior surface, a forward edge, and a trailing edge, and one, two or more flap hinges defining a lateral pivot axis of the flap, the pivot axis positioned at or rearward of the forward edge;
    one, two or more flap sweep members having a length, each flap sweep member having a forward end attached for pivoting at one of the flap sweep hinges, and a rearward end attached pivotally to one of the flap hinges, the flap sweep members pivotable to a deployment angle, from a neutral sweep position, at which the rearward end of the flap sweep members are farther away from the camber line of the airplane wing than at the neutral position, wherein the flap has a flap deployment angle, relative to a neutral flap position, dependent in part on the deployment angle of the flap sweep member;
    wherein the flap sweep member in an active position provides a slot having a gap distance between the flap frame and the forward edge of the flap, to allow airflow from along the lower surface of the wing to flow through the slot and to the interior surface of the flap.

2. The split-flap wing assembly according to claim 1, wherein the flap pivots at a flap pivot angle around the lateral pivot axis.

3. The split-flap wing assembly according to claim 1, wherein the gap distance of the slot increases with the increase in outward angle of the flap sweep member.

4. The split-flap wing assembly according to claim 1, wherein when the flap is at a neutral flap position, the deployment angle of the flap is dependent only on the deployment angle of the flap sweep member.

5. The split-flap wing assembly according to claim 1, further including a flap sweep pivoting means for pivoting the forward end of the one, two or more flap sweep members at the one, two or more flap sweep hinges.

6. The split-flap wing assembly according to claim 1, wherein the flap can pivot to a flap pivot angle, relative to the flap sweep member, between a neutral flap position and a passive flap position at an inward angle from the neutral flap position, with the trailing edge nearer to the camber line of the airplane wing than when the flap is at the neutral flap position, wherein the flap has a deployment angle, relative to the camber line of the wing, dependent on both the deployment angle of the flap sweep member and the flap pivot angle.

7. The split-flap wing assembly according to claim 1, further including a flap pivoting means for pivoting the flap at the flap hinges.

8. The split-flap wing assembly according to claim 1, wherein when the lateral pivot axis of the flap is rearward of the forward edge of the flap, the gap distance of the slot increases with an increase in inward flap pivot angle.

9. The split-flap wing assembly according to claim 1, wherein the wing includes two or more flap sweep hinges and two or more flap sweep members, the flap includes two or more flap pivot hinges positioned along opposite ends of the lateral pivot axis.

10. The split-flap wing assembly according to claim 9, wherein the two or more flap sweep members are configured to pivot to an outward angle of up to about 60 degrees.

11. The split-flap wing assembly according to claim 1, wherein flap is configured to pivot to an inward flap pivot angle of up to about 60 degrees.

12. The split-flap wing assembly according to claim 6, wherein the flap can further pivot between a neutral flap position and an active flap position at an outward flap pivot angle from the neutral flap position, with the trailing edge further from the camber line of the airplane wing than when the flap is at the neutral flap position.

13. The split-flap wing assembly according to claim 1, wherein the upper surface of the wing provides a spoiler frame, and the wing further includes a spoiler hinge disposed along a forward edge of the spoiler frame, and a spoiler that includes a control surface, an interior surface, a forward hinge edge, and a trailing edge, the spoiler hingedly connected at the forward hinge edge to the spoiler hinge for pivoting the spoiler within the spoiler frame.

14. The split-flap wing assembly according to claim 13, wherein the spoiler is configured to pivot to an inward deployment angle of up to about 60 degrees, an outward deployment angle of up to about 60 degrees, or both.

15. The split-flap wing assembly according to claim 13, wherein the wing includes two or more flap sweep hinges and two or more flap sweep members, the flap includes two or more flap hinges positioned along opposite ends of the lateral pivot axis.

16. The split-flap wing assembly according to claim 15, further including a flap sweep pivoting means for pivoting the forward end of the two or more flap sweep members at the two or more flap sweep hinges.

17. The split-flap wing assembly according to claim 16, wherein the flap can pivot to a flap pivot angle, relative to the flap sweep member, between a neutral flap position and a passive flap position at an inward angle from the neutral flap position, with the trailing edge nearer to the camber line of the airplane wing than when the flap is at the neutral flap position, wherein the flap has a deployment angle, relative to the camber line of the wing, dependent on both the deployment angle of the flap sweep member and the flap pivot angle.

18. The split-flap wing assembly according to claim 16, wherein the two or more flap sweep members are configured to pivot to an outward angle of up to about 60 degrees.

19. The split-flap wing assembly according to claim 18, wherein the flap is configured to pivot to an inward flap pivot angle of up to about 60 degrees, an outward flap pivot angle of up to about 60 degrees, or both.

20. A split-flap wing assembly for an aircraft, the wing assembly comprising:
   a wing including an upper surface, a lower surface with a flap frame, a camber line, and one, two or more flap sweep hinges disposed along a forward edge of the flap frame;
   a flap including a control surface, an interior surface, a forward edge, and a trailing edge, and one, two or more flap hinges defining a lateral pivot axis of the flap, the pivot axis positioned at or rearward of the forward edge;
   one, two or more flap sweep members having a length, each flap sweep member having a forward end attached for pivoting at one of the flap sweep hinges, and a rearward end attached pivotally to one of the flap hinges, the flap sweep members pivotable to a deployment angle, from a neutral sweep position, at which the rearward end of the flap sweep members are farther away from the camber line of the airplane wing than at the neutral position, wherein the flap has a flap deployment angle, relative to a neutral flap position, dependent in part on the deployment angle of the flap sweep member;
   wherein the flap sweep member in an active position provides a slot having a gap distance between the flap frame and the forward edge of the flap, to allow airflow from along the lower surface of the wing to flow through the slot and to the interior surface of the flap.

* * * * *